US011425458B2

(12) United States Patent
Sheppard et al.

(10) Patent No.: US 11,425,458 B2
(45) Date of Patent: Aug. 23, 2022

(54) METHODS AND APPARATUS TO ESTIMATE POPULATION REACH FROM MARGINAL RATINGS

(71) Applicant: The Nielsen Company (US), LLC, New York, NY (US)

(72) Inventors: Michael Sheppard, Holland, MI (US); Jonathan Sullivan, Hurricane, UT (US); Edward Murphy, North Stonington, CT (US); Michael D. Morgan, Bartlett, IL (US); Ludo Daemen, Duffel (BE)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/657,652

(22) Filed: Oct. 18, 2019

(65) Prior Publication Data

US 2020/0120387 A1 Apr. 16, 2020

Related U.S. Application Data

(63) Continuation of application No. 15/445,543, filed on Feb. 28, 2017, now abandoned.

(51) Int. Cl.
*H04N 21/442* (2011.01)
*G06Q 30/02* (2012.01)
*H04N 21/475* (2011.01)

(52) U.S. Cl.
CPC ... *H04N 21/44224* (2020.08); *G06Q 30/0201* (2013.01); *H04N 21/4756* (2013.01)

(58) Field of Classification Search
None
See application file for complete search history.

(56) References Cited

U.S. PATENT DOCUMENTS 5,956,692 A 9/1999 Foley
6,460,025 B1 10/2002 Fohn et al.
(Continued)

FOREIGN PATENT DOCUMENTS

JP 2015529870 10/2015
WO 2014210597 12/2014

OTHER PUBLICATIONS

Huckett et al., "Combining Methods to Create Synthetic Microdata: Quantile Regression, Hot Deck, and Rank Swapping," Research Gate, Apr. 2008, 11 pages.
(Continued)

*Primary Examiner* — Nasser M Goodarzi
*Assistant Examiner* — Terrika Peterson
(74) *Attorney, Agent, or Firm* — Hanley, Flight & Zimmerman, LLC

(57) ABSTRACT

Methods, apparatus, systems, and articles of manufacture are disclosed to to estimate population reach from marginal ratings. An example apparatus includes an interface to access marginal ratings of the media for a recorded audience, marginal ratings of the media for a population audience, and reach of the media for the recorded audience; a reach determiner to iteratively estimate a reach of the media for the population audience based on the marginal ratings for the recorded audience, the marginal ratings for the population audience, and the reach for the recorded audience; and the interface to output the estimated reach for the population audience.

20 Claims, 5 Drawing Sheets

(56) References Cited

U.S. PATENT DOCUMENTS

| | | |
|---|---|---|
| 6,775,663 B1 | 8/2004 | Kim |
| 7,197,472 B2 | 3/2007 | Conkwright et al. |
| 7,746,272 B2 | 6/2010 | Vollath |
| 7,865,916 B2 | 1/2011 | Beser et al. |
| 7,954,120 B2 | 5/2011 | Roberts et al. |
| 8,087,041 B2 | 12/2011 | Fu et al. |
| 8,112,301 B2 | 2/2012 | Harvey et al. |
| 8,149,162 B1 | 4/2012 | Pauls |
| 8,185,456 B2 | 5/2012 | LeClair et al. |
| 8,200,693 B2 | 6/2012 | Steele et al. |
| 8,423,406 B2 | 4/2013 | Briggs |
| 8,453,173 B1 | 5/2013 | Anderson et al. |
| 8,619,892 B2 | 12/2013 | Vetter et al. |
| 8,874,652 B1 | 10/2014 | Pecjak et al. |
| 8,973,023 B1 | 3/2015 | Rao et al. |
| 9,070,139 B2 | 6/2015 | Zhang |
| 9,111,186 B2 | 8/2015 | Blasinski et al. |
| 9,224,094 B2 | 12/2015 | Oliver et al. |
| 9,236,962 B2 | 1/2016 | Hawkins et al. |
| 9,420,320 B2 | 8/2016 | Doe |
| 9,529,836 B1 | 12/2016 | Hale |
| 10,045,057 B2 | 8/2018 | Shah et al. |
| 10,070,166 B2 | 9/2018 | Chaar et al. |
| 10,313,752 B2 | 6/2019 | Nagaraja Rao et al. |
| 10,491,696 B2 | 11/2019 | Gierada |
| 10,602,224 B2 | 3/2020 | Sullivan et al. |
| 10,728,614 B2 | 7/2020 | Sheppard et al. |
| 11,115,710 B2 | 9/2021 | Sheppard et al. |
| 11,140,449 B2 | 10/2021 | Sullivan et al. |
| 11,323,772 B2 | 5/2022 | Sheppard et al. |
| 2002/0123928 A1 | 9/2002 | Eldering et al. |
| 2003/0037041 A1 | 2/2003 | Hertz |
| 2004/0001538 A1* | 1/2004 | Garrett .............. H04L 25/03267 375/229 |
| 2004/0059549 A1 | 3/2004 | Kropaczek et al. |
| 2006/0190318 A1 | 8/2006 | Downey et al. |
| 2007/0087756 A1 | 4/2007 | Hoffberg |
| 2008/0028006 A1 | 1/2008 | Liu et al. |
| 2008/0228543 A1 | 9/2008 | Doe |
| 2008/0300965 A1 | 12/2008 | Doe |
| 2008/0313017 A1 | 12/2008 | Totten |
| 2010/0161385 A1 | 6/2010 | Karypis et al. |
| 2010/0191723 A1 | 7/2010 | Perez et al. |
| 2011/0196733 A1 | 8/2011 | Li et al. |
| 2012/0023522 A1 | 1/2012 | Anderson et al. |
| 2012/0052930 A1 | 3/2012 | McGucken |
| 2012/0066410 A1 | 3/2012 | Stefanakis et al. |
| 2012/0072940 A1 | 3/2012 | Fuhrer |
| 2012/0110027 A1 | 5/2012 | Falcon |
| 2012/0254911 A1 | 10/2012 | Doe |
| 2013/0138743 A1 | 5/2013 | Amento et al. |
| 2013/0198125 A1* | 8/2013 | Oliver ................. H04L 43/0876 706/46 |
| 2013/0254787 A1 | 9/2013 | Cox et al. |
| 2013/0290233 A1 | 10/2013 | Ferren et al. |
| 2013/0339991 A1 | 12/2013 | Ricci |
| 2013/0346033 A1 | 12/2013 | Wang et al. |
| 2014/0101685 A1 | 4/2014 | Kitts et al. |
| 2014/0112557 A1 | 4/2014 | Santamaria-Pang et al. |
| 2014/0278933 A1* | 9/2014 | McMillan .......... G06Q 30/0246 705/14.45 |
| 2014/0280891 A1 | 9/2014 | Doe |
| 2014/0337104 A1 | 11/2014 | Splaine et al. |
| 2014/0358676 A1 | 12/2014 | Srivastava et al. |
| 2015/0032310 A1 | 1/2015 | Zettel et al. |
| 2015/0180989 A1 | 6/2015 | Seth |
| 2015/0186403 A1* | 7/2015 | Srivastava ............ G06F 16/215 707/692 |
| 2015/0193813 A1 | 7/2015 | Toupet et al. |
| 2015/0332310 A1 | 11/2015 | Cui et al. |
| 2015/0332317 A1* | 11/2015 | Cui .................... G06Q 30/0275 705/14.46 |
| 2016/0012314 A1 | 1/2016 | Ramamurthy et al. |
| 2016/0086208 A1 | 3/2016 | Oliver et al. |
| 2016/0134934 A1 | 5/2016 | Jared et al. |
| 2016/0162955 A1 | 6/2016 | O'Kelley et al. |
| 2016/0165277 A1 | 6/2016 | Kirillov et al. |
| 2016/0232563 A1 | 8/2016 | Perez et al. |
| 2016/0249098 A1 | 8/2016 | Pecjak et al. |
| 2016/0269783 A1 | 9/2016 | Mowrer et al. |
| 2016/0323616 A1 | 11/2016 | Doe |
| 2016/0373820 A1 | 12/2016 | Meyer et al. |
| 2016/0379246 A1 | 12/2016 | Sheppard et al. |
| 2017/0006342 A1 | 1/2017 | Nagaraja Rao et al. |
| 2017/0155956 A1 | 6/2017 | Nagaraja Rao et al. |
| 2017/0187478 A1 | 6/2017 | Shah et al. |
| 2017/0213243 A1 | 7/2017 | Dollard |
| 2017/0300911 A1 | 10/2017 | Alnajem |
| 2018/0073933 A1 | 3/2018 | Keskin et al. |
| 2018/0225709 A1 | 8/2018 | Ferber et al. |
| 2018/0249208 A1 | 8/2018 | Sheppard et al. |
| 2018/0249210 A1 | 8/2018 | Sheppard et al. |
| 2018/0249211 A1 | 8/2018 | Sheppard et al. |
| 2018/0249214 A1 | 8/2018 | Sullivan et al. |
| 2018/0376198 A1 | 12/2018 | Sheppard et al. |
| 2019/0147461 A1 | 5/2019 | Sheppard et al. |
| 2019/0354574 A1 | 11/2019 | Wick et al. |
| 2019/0356950 A1 | 11/2019 | Sheppard et al. |
| 2020/0204863 A1 | 6/2020 | Sullivan et al. |
| 2020/0294069 A1 | 9/2020 | Sheppard et al. |
| 2020/0296441 A1 | 9/2020 | Sheppard et al. |
| 2020/0359090 A1 | 11/2020 | Sheppard et al. |
| 2021/0014564 A1 | 1/2021 | Sheppard et al. |
| 2021/0133773 A1 | 5/2021 | Sheppard et al. |
| 2021/0319002 A1 | 10/2021 | Ryan et al. |
| 2021/0319474 A1 | 10/2021 | Sheppard et al. |
| 2022/0038781 A1 | 2/2022 | Sullivan et al. |
| 2022/0058667 A1 | 2/2022 | Sheppard et al. |
| 2022/0159326 A1 | 5/2022 | Sheppard et al. |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek,"Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

United States Patent and Trademark Office, "Non-Final Office Action," issued in connection with U.S. Appl. No. 15/445,530, dated Apr. 11, 2018, 9 pages.

United States Patent and Trademark Office, "Non-Final Office Action," issued in connection with U.S. Appl. No. 15/445,557, dated Jun. 29, 2018, 11 pages.

United States Patent and Trademark Office, "Non-Final Office Action," issued in connection with U.S. Appl. No. 15/635,153, dated Feb. 5, 2018, 8 pages.

United States Patent and Trademark Office, "Notice of Allowance," issued in connection with U.S. Appl. No. 15/635,153, dated Jul. 23, 2018, 8 pages.

United States Patent and Trademark Office, "Non-Final Office Action," issued in connection with U.S. Appl. No. 15/619,257, dated Jun. 15, 2018, 15 pages.

United States Patent and Trademark Office, "Notice of Allowance," issued in connection with U.S. Appl. No. 15/635,153, dated Oct. 17, 2018, 14 pages.

United States Patent and Trademark Office, "Final Office Action," issued in connection with U.S. Appl. No. 15/445,557, dated Dec. 27, 2018, 9 pages.

(56) References Cited

OTHER PUBLICATIONS

United States Patent and Trademark Office, "Notice of Allowance," issued in connection with U.S. Appl. No. 15/445,530, dated Jan. 2, 2019, 7 pages.
United States Patent and Trademark Office, "Final Office Action," issued in connection with U.S. Appl. No. 15/619,257, dated Jan. 18, 2019, 18 pages.
United States Patent and Trademark Office, "Notice of Allowance," issued in connection with U.S. Appl. No. 15/635,153, dated Mar. 21, 2019, 7 pages.
United States Patent and Trademark Office, "Notice of Allowability," issued in connection with U.S. Appl. No. 15/635,153, dated Apr. 8, 2019, 2 pages.
United States Patent and Trademark Office, "Notice of Allowance," issued in connection with U.S. Appl. No. 15/445,557, dated Apr. 15, 2019, 8 pages.
United States Patent and Trademark Office, "Notice of Allowance," issued in connection with U.S. Appl. No. 15/445,530, dated May 3, 2019, 5 pages.
United States Patent and Trademark Office, "Notice of Allowability," issued in connection with U.S. Appl. No. 15/445,530, dated May 21, 2019, 2 pages.
United States Patent and Trademark Office, "Non-Final Office Action," issued in connection with U.S. Appl. No. 15/445,543, dated Jan. 11, 2018, 19 pages.
United States Patent and Trademark Office, "Final Office Action," issued in connection with U.S. Appl. No. 15/445,543, dated Aug. 3, 2018, 16 pages.
United States Patent and Trademark Office, "Non-Final Office Action," issued in connection with U.S. Appl. No. 15/445,543, dated Jan. 8, 2019, 15 pages.
United States Patent and Trademark Office, "Final Office Action," issued in connection with U.S. Appl. No. 15/445,543, dated Jul. 18, 2019, 12 pages.
United States Patent and Trademark Office, "Notice of Allowance and Fee(s) Due," issued in connection with U.S. Appl. No. 15/445,530, dated Sep. 25, 2019, 5 pages.
Haggin, Patience et al., "Google Nears a Long-Tipped Limit on Tracking 'Cookies,' in Blow to Rivals," The Wall Street Journal, May 6, 2019, obtained from https://www.wsj.com/articles/googles-new-privacy-tools-to-make-cookies-crumble-competitors-stumble-11557151913, 3 pages.
United States Patent and Trademark Office, "Notice of Allowance," issued in connection with U.S. Appl. No. 15/445,530, dated Jan. 31, 2020, 10 pages.
United States Patent and Trademark Office, "Notice of Allowance," issued in connection with U.S. Appl. No. 15/445,557, dated Jul. 26, 2019, 7 pages.
United States Patent and Trademark Office, "Notice of Allowance and Fee(s) Due," issued in connection with U.S. Appl. No. 15/445,557, dated Nov. 5, 2019, 9 pages.
International Searching Authority. "International Search Report & Written Opinion", issued in connection with application No. PCT/US2020/022438 dated Jul. 6, 2020, 10 pages.
International Searching Authority. "International Search Report & Written Opinion," issued in connection with application No. PCT/US2020/022436 dated Jul. 6, 2020, 9 pages.
United States Patent and Trademark Office, "Final Office Action," issued in connection with U.S. Appl. No. 16/526,747, dated Dec. 30, 2020, 9 pages.
United States Patent and Trademark Office, "Non-Final Office Action," issued in connection with U.S. Appl. No. 16/355,386, dated Nov. 9, 2020, 9 pages.
United States Patent and Trademark Office, "Non-Final Office Action," issued in connection with U.S. Appl. No. 16/526,747, dated Jul. 23, 2020, 8 pages.
United States Patent and Trademark Office, "Notice of Allowance," issued in connection with U.S. Appl. No. 16/355,393, dated Jul. 8, 2020, 8 pages.
United States Patent and Trademark Office, "Non-Final Office Action," issued in connection with U.S. Appl. No. 16/893,129, dated Apr. 13, 2021, 9 pages.
United States Patent and Trademark Office, "Notice of Allowance," issued in connection with U.S. Appl. No. 16/526,747, dated Apr. 28, 2021, 8 pages.
United States Patent and Trademark Office, "Final Office Action," issued in connection with U.S. Appl. No. 16/355,386, dated May 4, 2021, 11 pages.
United States Patent and Trademark Office, "Notice of Allowance," issued in connection with U.S. Appl. No. 16/805,361, dated Feb. 18, 2021, 9 pages.
United States Patent and Trademark Office, "Non-Final Office Action," issued in connection with U.S. Appl. No. 16/939,996, dated Jun. 24, 2021, 15 pages.
United States Patent and Trademark Office, "Non-Final Office Action," issued in connection with U.S. Appl. No. 16/843,650, dated May 26, 2021, 26 pages.
United States Patent and Trademark Office, "Notice of Allowance," issued in connection with U.S. Appl. No. 16/893,129, dated Jul. 29, 2021, 5 pages.
United States Patent and Trademark Office, "Notice of Allowance," issued in connection with U.S. Appl. No. 16/355,386, dated Aug. 30, 2021, 7 pages.
United States Patent and Trademark Office, "Notice of Allowance," issued in connection with U.S. Appl. No. 16/805,361, dated Jun. 3, 2021, 8 pages.
International Searching Authority, "International Preliminary Report on Patentability", issued in connection with application No. PCT/US2020/022436 dated Sep. 16, 2021, 5 pages.
International Searching Authority, "International Preliminary Report on Patentability", issued in connection with application No. PCT/US2020/022438 dated Sep. 16, 2021, 6 pages.
United States Patent and Trademark Office, "Non-Final Office Action," issued in connection with U.S. Appl. No. 17/093,460, dated Oct. 22, 2021, 5 pages.
United States Patent and Trademark Office, "Non-Final Office Action," issued in connection with U.S. Appl. No. 16/676,158, dated Nov. 29, 2021, 24 pages.
United States Patent and Trademark Office, "Notice of Allowance," issued in connection with U.S. Appl. No. 16/893,129, dated Dec. 14, 2021, 5 pages.
United States Patent and Trademark Office, "Corrected Notice of Allowbility," issued in connection with U.S. Appl. No. 16/355,386, dated Dec. 9, 2021, 2 pages.
United States Patent and Trademark Office, "Final Office Action," issued in connection with U.S. Appl. No. 16/939,996, dated Dec. 16, 2021, 19 pages.
United States Patent and Trademark Office, "Final Office Action," issued in connection with U.S. Appl. No. 16/843,650, dated Dec. 17, 2021, 33 pages.
United States Patent and Trademark Office, "Notice of Allowance and Fee(s) Due," issued in connection with U.S. Appl. No. 17/093,460, dated Mar. 1, 2022, 9 pages.
United States Patent and Trademark Office, "Non-Final Office Action," issued in connection with U.S. Appl. No. 17/408,208, dated Jan. 5, 2022, 21 pages.
United States Patent and Trademark Office, "Notice of Allowance," issued in connection with U.S. Appl. No. 16/939,996, dated Mar. 11, 2022, 8 pages.
United States Patent and Trademark Office, "Non-Final Office Action," issued in connection with U.S. Appl. No. 17/099,510, dated Mar. 29, 2022, 6 pages.
United States Patent and Trademark Office, "Non-Final Office Action," issued in connection with U.S. Appl. No. 16/676,158, dated Mar. 18, 2022, 29 pages.
United States Patent and Trademark Office, "Corrected Notice of Allowability," issued in connection with U.S. Appl. No. 16/893,129, dated Dec. 22, 2021, 2 pages.
International Searching Authority, "International Search Report Written Opinion," issued in connection with application No. PCT/US21/26010 dated Jul. 26, 2021, 8 pages.

(56) References Cited

OTHER PUBLICATIONS

United States Patent and Trademark Office, "Corrected Notice of Allowability," issued in connection with U.S. Appl. No. 16/893,129, dated Apr. 8, 2022, 2 pages.
United States Patent and Trademark Office, "Final Office Action," issued in connection with U.S. Appl. No. 17/408,208, dated Apr. 20, 2022, 26 pages.
Esch et al., "Appendix 8 Numerical Methods for Solving Nonlinear Equations," Asset and Risk Management: Risk Oriented Finance, published 2005 by John Wiley & Sons Ltd., 7 pages.

* cited by examiner

METHODS AND APPARATUS TO ESTIMATE POPULATION REACH FROM MARGINAL RATINGS

RELATED APPLICATION

This patent arises from a continuation of U.S. patent application Ser. No. 15/445,543, entitled "METHODS AND APPARATUS TO ESTIMATE POPULATION REACH FROM MARGINAL RATINGS," filed on Feb. 28, 2017. Priority to U.S. patent application Ser. No. 15/445,543 is claimed. U.S. patent application Ser. No. 15/445,543 is incorporated herein by reference in its entirety.

FIELD OF THE DISCLOSURE

This disclosure relates generally to media audience measurement, and, more particularly, to methods and apparatus to estimate population reach from marginal ratings.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data from media presentation devices (e.g., set-top boxes) that identifies tuning data from the media presentation device. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

DETAILED DESCRIPTION

Figure 1:
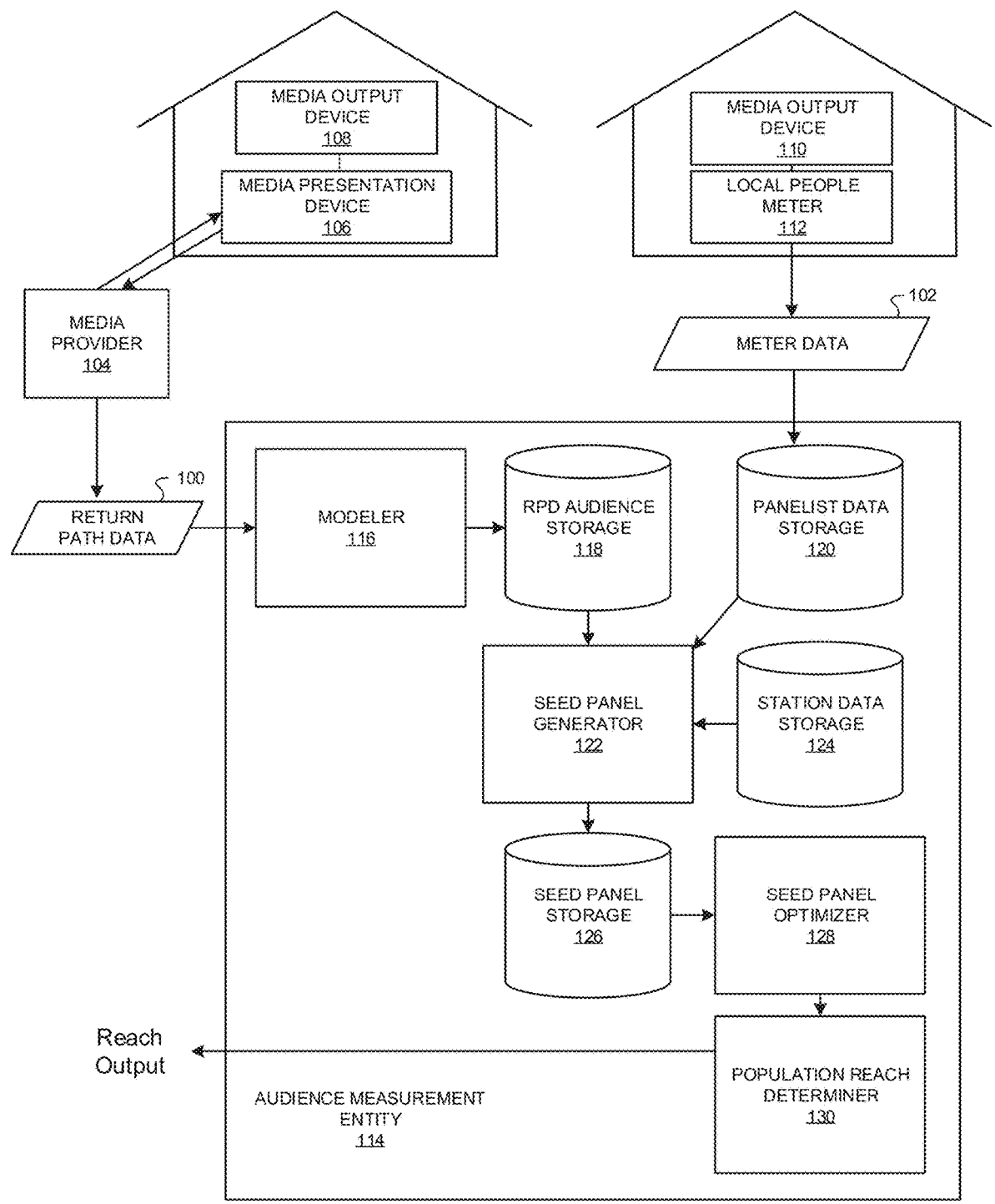
FIG. 1 is a block diagram of an example environment in which return path data and meter data are collected from media presentation locations and are analyzed by an example audience measurement entity to estimate media reach for a population based on audience marginal ratings data.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation.

For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

In some examples, the audience measurement entity processes the collected and/or aggregated metering data for markets where a panel is maintained and obtains (e.g., from one or more service provider) return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity to the segment of the market that is not covered by return path data. These monitored panelists are selected from a panel (e.g., a national panel of metered users) based on a regional proximity to a designated market area, a similarity between demographics of the monitored panelists and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is represented by audience (e.g., viewer or listener) assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete synthesized time records (e.g., at the quarter hour level, hour level, etc.) across each broadcasting day of all viewing session by individual family member and guest on individual metered media output devices in a home, and include the demographic data. As used herein, designated market area is a geographical area that defines a media market where synthetic respondent level data is produced.

In some examples, the audience measurement entity adjusts the seed panel to satisfy target ratings and/or target reach. As used herein, a rating is an average percentage of a population exposed to media across a set time interval. As used herein, reach is a cumulative percentage or total of a population that has been counted as a viewer of the media at least once during a specified time interval (e.g., hourly, daily, weekly, monthly, etc.). Examples disclosed herein adjust the seed panel by adjusting weights of seed panelists corresponding to the target rating and/or reach until the target rating and/or reach is satisfied. For example, if the target rating is 25% of men exposed to a first program during a first duration of time and 30% of the generated seed panel men were exposed to the first program during the first duration of time, the audience measurement entity may adjust the seed panel to reduce the current rating (e.g., 30%) for that demographic, to a rating closer to the target rating (e.g., 25%). The audience measurement entity may use the adjusted seed panel to generate media exposure data based on marginal data (e.g., quarter hours, hours, days, etc.). Such media exposure data may include a total number of seed panelists exposed to the media at the different margins, a total population of audience members exposed to the media at the different margins, a total number of deduplicated seed panelists exposed to the media (e.g., an audience reach) from all of the different marginal rating (e.g., probabilities), and a total population size (e.g., universe estimate) of users that potentially could be exposed to the media. As used herein, a marginal rating corresponds to a probability that a person in the universe of people was exposed to media for a particular duration of time. As used herein, a recorded audience refers to monitored panelists exposed to media and a population audience represent the total population of people (e.g., monitored panelists and other unmonitored media consumers associated with return path data) exposed to the media. Although examples disclosed herein are described in conjunction with marginal data from a seed panel, examples disclosed herein may be utilized to determine population data based on any type of recorded data.

Examples disclosed herein receive marginal media exposure data for different instances of media exposure (e.g., different episodes of a television series, different quarter hour time slots of a television program, or a radio program, etc.) and estimates a population reach across all of the different instances of media exposure based on the marginal media exposure data. Traditional techniques of determining the total population based on marginal media ratings include numerical calculations that enumerate the marginal rating data for all combinations in which someone can watch a program. The number of probabilities to be solved by such traditional techniques is $2^n$ number of probabilities, where n is the number of marginal probabilities provided in the marginal ratings data (e.g., the ratings for the different possible instances of media exposure). For example, if reach is to be calculated across 4 quarter hours (e.g., for an hour-long media exposure), which corresponds to four possible marginal ratings, the total number of probabilities to be solved using such a traditional technique is 16 (e.g., $2^4$). If the reach is to be calculated across 96 quarter hours (e.g., a day-long media exposure), the total number of probabilities to be solved using such a traditional technique is $8*10^{28}$ (e.g., $2^{96}$) thereby exceeding the memory limit and/or processing power of any existing computer. Examples disclosed herein alleviate such memory/processing resource problems associated with such a traditional technique by calculating the solution using the disclosed analytical process.

To estimate the total population reach, examples disclosed herein determine pseudo universe estimate(s) (e.g., a pseudo universe estimate of the monitored (also referred to as the recorded) audience and a pseudo universe estimate of the return path data (also referred to as the population) audience). A pseudo universe estimate corresponds to what the size of the universe of individual capable of being in a given audience would need to be to achieve the ratings and reach values for that audience if the different marginal ratings are assumed to be independent, regardless of how much dependence actually exists. For example, when the universe of a recorded audience is equal to the pseudo universe value, then the total reach of the recorded audience can be calculated from the audience marginal ratings assuming they are independent. However, if there is a difference between the pseudo universe of the recorded audience and the actual universe of the recorded audience, the audience marginal ratings are dependent. Examples disclosed herein (A) access marginal ratings for the recorded audience, marginal ratings for the population audience, reach for the recorded audience, and total population size (e.g., the actual universe estimate) and (B) determine pseudo universe estimates to solve a system of equations resulting in the population audience reach. The system of equations includes a link tool (e.g., a link equation), which is based on the pseudo universe estimates to link that dependency of the population audience marginal ratings to the dependencies exhibited by recorded audience marginal ratings. In this manner, examples disclosed herein determine the population audience reach from the marginal ratings, in a manner that takes into account the dependency among the different marginal ratings.

Examples disclosed herein use the below system of Equations (e.g., Equations 1a-3a), to determine the total population reach.

$$1 - \frac{A_d}{Q_R} = \prod_{i=1}^{N}\left(1 - \frac{A_i}{Q_R}\right) \quad \text{(Equation 1a)}$$

$$\frac{Q_R - A_d}{UE - A_d} = \frac{Q_P - X_d}{UE - X_d} \quad \text{(Equation 2a)}$$

$$1 - \frac{X_d}{Q_P} = \prod_{i=1}^{N}\left(1 - \frac{X_i}{Q_P}\right) \quad \text{(Equation 3a)}$$

In the preceding equations, UE is the actual universe estimate (e.g., the total population size), $A_d$ is the total recoded audience reach, $Q_R$ is the pseudo universe estimate of the recorded audience, N is the number of marginals, $A_i$ is the recorded audience marginal rating for the ith marginal, $X_d$ is the total population reach, $Q_P$ is the pseudo universe estimate of the population audience, and $X_i$ is the population marginal rating for the ith marginal. The pseudo universe estimates of the recorded audience and the population audience of Equations 1 and 3 represent the sizes of the respective recorded and population audiences would need to be for the respective marginal rating to yield to corresponding reach value if there was independence between the different marginal ratings. Equation 2 is the link between the independency assumption and the actual dependency exhibited by the recorded population. In the above Equations 1a-3a, Equation 1a defines the relationship between the recorded audience reach and the recorded audience marginal ratings assuming independence of the marginal ratings and the total population size is the pseudo universe for the recorded audience, Equation 3a defines relationship between the population audience reach and the population audience marginal ratings assuming independence of the marginal ratings and the total population size is the pseudo universe for the population audience, and Equation 2a is the link tool linking the independence associated with Equations 1a and 3a with the actual dependence of the marginal ratings.

Additionally or alternatively, Equations 1a-3a may be normalized across the UE, where each variable is a percentage of the actual universe estimate (UE), as shown in the below system of Equations (e.g., Equations 1b-3b).

$$1 - \frac{A_d}{Q_R} = \prod_{i=1}^{N}\left(1 - \frac{A_i}{Q_R}\right) \quad \text{(Equation 1b)}$$

$$\frac{Q_R - A_d}{1 - A_d} = \frac{Q_P - X_d}{1 - X_d} \quad \text{(Equation 2b)}$$

$$1 - \frac{X_d}{Q_P} = \prod_{i=1}^{N}\left(1 - \frac{X_i}{Q_P}\right) \quad \text{(Equation 3b)}$$

In some examples disclosed herein, the above system of equations may be solved using a root-finding algorithm which may require a nonlinear root finding system. Alternatively, the above system of equations may be adjusted to determine the total population reach without the need of a root-finding algorithm. For example, solving Equation 1a for $Q_R$ results in Equation 4.

$$Q_R = \frac{A_d}{1 - \prod_{i=1}^{N}\left(1 - \frac{A_i}{Q_R}\right)} \quad \text{(Equation 4)}$$

In Equation 4, $Q_R$ is a recursive function of itself, which can be solved iteratively for the subsequent pseudo estimate, as shown in Equation 5.

$$Q_R^{k+1} = \frac{A_d}{1 - \prod_{i=1}^{N}\left(1 - \frac{A_i}{Q_R^k}\right)} \quad \text{(Equation 5)}$$

At a given iteration, because $Q_R^k$ is known, examples disclosed herein can solve $Q_P^k$ using Equation 2a and rephrase Equation 3a to solve for $X_d$. Accordingly, Equations 1a-3a may be rephrased and solved iteratively using the Equations 6-8 below, thereby eliminating the need to using a root-finding algorithm.

$$Q_P^k = X_d^k + (UE - X_d^k)\left(\frac{Q_R^k - A_d}{UE - A_d}\right) \quad \text{(Equation 6)}$$

$$X_d^{k+1} = Q_P^k\left(1 - \prod_{i=1}^{N}\left(1 - \frac{X_i}{Q_P^k}\right)\right) \quad \text{(Equation 7)}$$

-continued $$Q_R^{k+1} = \frac{A_d}{1 - \prod_{i=1}^{N}\left(1 - \frac{A_i}{Q_R^k}\right)}$$ (Equation 8)

In the preceding equations, Equation 6 defines the pseudo universe estimate of the population and is the link tool linking the independence assumption of Equations 7 and 8 with the actual dependencies exhibited by the marginal ratings, and Equation 8 defines the pseudo universe estimate of the recorded audience. In some examples, Equations 1b-3b may be rephrased resulting in a system of equations similar to Equations 6-8, but that is normalized across the UE. Examples disclosed herein initialize $Q_R$ and $X_d$ with some value, during the first processing iteration, and converge on a solution for $X_d$ through multiple iterations of Equations 6-8. Examples disclosed herein iteratively solve for $Q_R$ and $X_d$, until Equations 6-8 substantially equal (e.g., within some error threshold) to their respective solution during the preceding iteration. Using examples disclosed herein, population reach from the any number of different margins may be calculated.

FIG. 1 is a block diagram of an environment in which example return path data 100 and example meter data 102 are collected to determine reach based on a marginal ratings data. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example modeler 116, an example return path data (RPD) audience storage 118, an example panelist data storage 120, an example seed panel generator 122, an example station data storage 124, an example seed panel storage 126, an example seed panel optimizer 128, and an example population reach determiner 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, and/or any other device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable of present media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from a set monitored panelists corresponding to the LPM(s) 112 selected based on a return path data audience and/or homes. The seed panelists are selected to represent the return path data audience and/or homes. The example seed panel generator 122 assigns geography and income data to the persons and/or homes corresponding to the audience assigned return path data and the meter data 102. The example seed panel generator 122 initiates the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc. The example station data storage 124 stores data related to station receivability by county. The example seed panel generator 122 uses the station data to calculate the station receivability for over the air homes. In some examples, the seed panel generator 122 filters the seed panelists to collect attributes of interest at the person level and/or the household level. Attributes of interest at the person level may include age, gender, ethnicity, nationality, race, etc., and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The example seed panel generator 122 stores the final seed panel in the example seed panel storage 126. The final seed panel includes synthetic respondent level data associated with the seed panel.

The example seed panel optimizer 128 of FIG. 1 adjusts the seed panel generated by the example seed panel generator 122 to satisfy target ratings and/or target household ratings based on constraints. Such constraints may include audience constraints, including quarter hour constraints, daypart constraints, daily constraints, weekly constraints, monthly constraints, etc. Such constraints may also include reach constraints, including daypart reach constraints, daily reach constraints, weekly reach constraints, monthly reach constraints, etc. In some examples, the seed panel optimizer 128 applies a discrete optimization greedy search to adjust the panels to satisfy the target ratings and/or target household ratings based on the constraints. The example seed panel optimizer 128 transmits the adjusted seed panel data with corresponding synthetic level data (e.g., data related to the media corresponding to the target rating) to the example population reach determiner 130. The corresponding synthetic level data may include, for example, recorded audience marginal ratings of the media, population marginal ratings of the media, total reach of the recorded audience from marginal ratings, and a universe estimate. In some examples, parts of the synthetic level data may come from the adjusted seed panel and other parts may come from other data gathering devices and/or storage.

The example population reach determiner 130 of FIG. 1 receives the recorded audience marginal ratings (e.g., from the meter data 102) for at different marginals (e.g., quarter hours, half hours, hours, days, etc.) of given media, the population marginal ratings (e.g., from the return path data 100) for the different marginals of the media, the total reach (e.g., from the meter data 102) for the recorded audience and a total population size (e.g., the actual universe estimate) from one or more devices. Additionally, the example population reach determiner 130 determines a total population reach for the given media based on the received data. The example population reach determiner 130 determines the total population reach for the given media analytically using Equations 1a-3a or 1b-3b and/or Equations 6-8, thereby reducing memory and/or processing resources associated with the traditional numerical calculation. The example population reach determiner 130 outputs the reach output to another device and/or user. The example population reach determiner 130 is further described in conjunction with FIG. 2.

Figure 2:
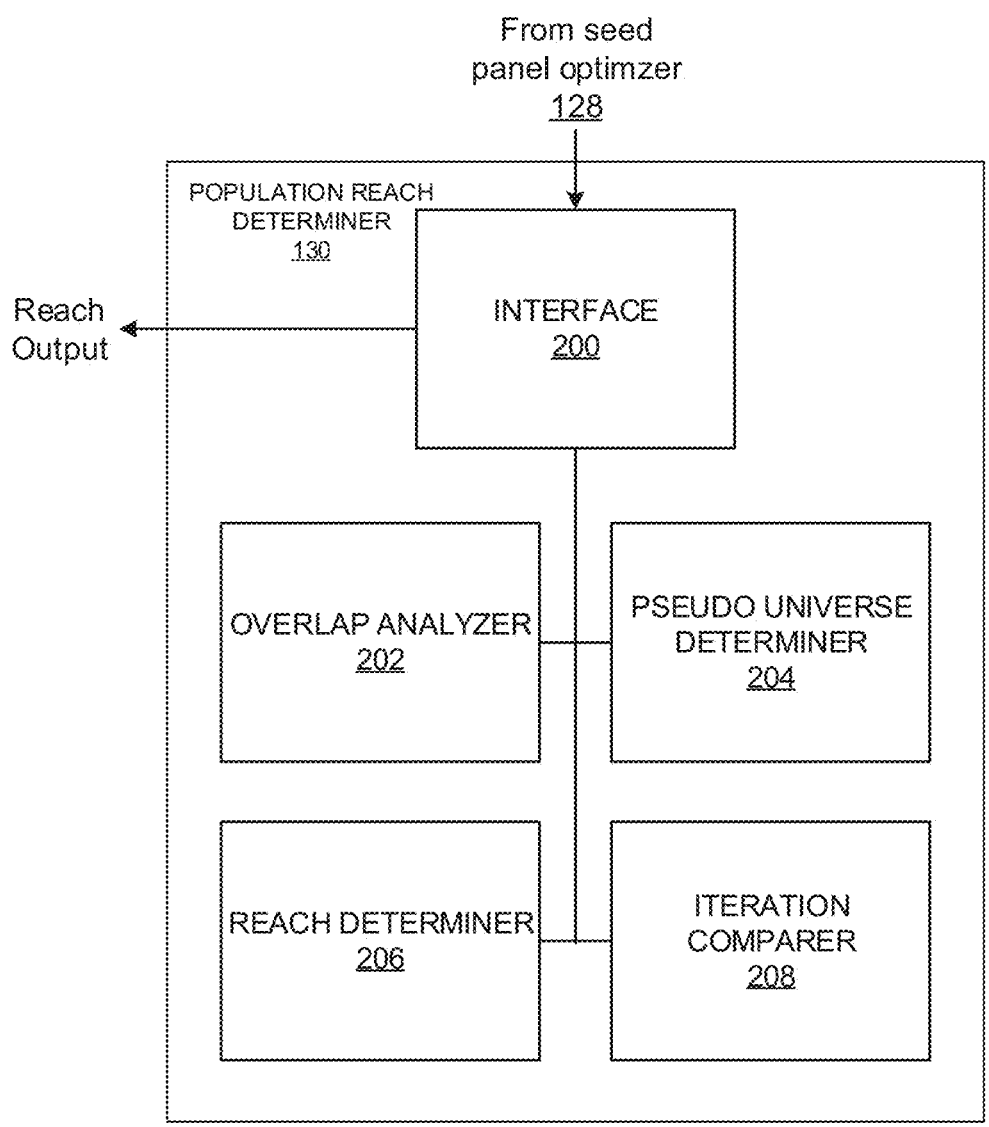
FIG. 2 is a block diagram of an example implementation of a population reach determiner of FIG. 1.

FIG. 2 is a block diagram of an example implementation of the example population reach determiner 130 of FIG. 1 to determine population reach for given media based on marginal ratings data. The example population reach determiner 130 of FIG. 2 includes an example interface(s) 200, an example overlap analyzer 202, an example pseudo universe determiner 204, an example reach determiner 206, and an example iteration comparer 208. Although the example population reach determiner 130 is described in conjunction data generated by the example seed panel optimizer 128 of FIG. 1, the example population reach determiner 130 may determine reach based on information provided by any device that is capable of inputting audience marginal ratings, population marginal ratings, audience reach from the different marginal ratings, and universe estimates. For example, the example population reach determiner 130 may determine from different programs, stores visits for different stores, website visits, etc. The population reach determiner 130 may determine population reach based on any data that relates to a recorded audience to a population (e.g., panelist data, survey data, etc.), regardless if the recorded audience is included in the population.

The example interface(s) 200 of FIG. 2 receives recorded audience marginal ratings corresponding to media for two or more margins (e.g., quarter hours), population audience marginal ratings corresponding to the media for the two or more margins, recorded audience reach from two or more marginal ratings, and a universe estimate of users. As described above, although the illustrated example of FIGS. 1 and 2 include the example seed panel optimizer 128 providing such data, the data may come from any data providing device and/or may correspond to any type of data (e.g., website exposures, store entries, etc.) related to media exposure at different marginals. In the illustrated example, the marginals are broken up into quarter hours. For example, the recorded and/or population audience marginal ratings may correspond to four quarter hour marginals of an hour media program. However, the marginals may be broken up into any increments of time (hours, days, etc.). Additionally, the example interface(s) 200 may output an estimated population reach (e.g., reach output) to another device/system and/or as a report to a user.

The example overlap analyzer 202 of FIG. 2 compares the recorded audience marginal ratings with the total recorded audience to determine if the recorded audience is independent/mutually exclusive (e.g., containing no overlap of audience members between marginals) or if there is complete overlap (e.g., the highest recorded total audience includes all the audiences from other marginals). The example overlap analyzer 202 determines that the recorded audience is mutually exclusive by summing the recorded audience marginal ratings from the different marginals. If the sum is equal to the total recorded audience, then the overlap analyzer 202 determines that the audience is mutually exclusive. When the example overlap analyzer 202 determines that the audience is mutually exclusive, the example overlap analyzer 202 determines the reach of the media to be the minimum of (A) the universe estimate and (B) the sum of the population audience marginal ratings. The example overlap analyzer 202 determines that there is a complete overlap when the maximum recorded audience entry for a marginal is equal to the total recorded audience from marginal ratings. When the overlap analyzer 202 determines that the audience includes complete overlap, the example overlap analyzer 202 determines the reach to be the maximum of the population marginal ratings.

The example pseudo universe determiner 204 of FIG. 2 generates and/or adjusts pseudo universe estimates as part of an iterative process to determine population reach. As described above, a pseudo universe corresponds to what the size of the universe of individual capable of being in a given audience would need to be to achieve the ratings and reach values for that audience if the different marginal ratings are assumed to be independent, regardless of how much dependence actually exists. The example pseudo universe determiner 204 generates and/or adjusts recorded pseudo universe estimates and population pseudo universe estimates to increase the efficiency of the reach calculation. As further described below in conjunction with FIGS. 3 and 4, the example pseudo universe determiner 204 initializes the pseudo estimate for the recorded audience to the universe estimate. In subsequent iterations, the initial pseudo estimate is updated (e.g., adjusted) until the reach converges to an appropriate estimate.

The example reach determiner 206 of FIG. 2 generates and/or adjusts reach estimates until the reach converges to an appropriate estimate. As described above, the reach is a deduplicated total audience corresponding to the total audience of given media who contributed to at least one of the different marginal ratings of the media. The example reach determiner 206 generates and/or adjusts total population reach to increase the efficiency of the reach calculation. As further described below in conjunction with FIGS. 3 and 4, the example reach determiner 206 initializes the reach based on a probability that an audience member is not in the audience population. In subsequent iterations, the total audience reach is updated (e.g., adjusted) until the reach converges to an appropriate estimate (e.g., within a margin of error).

The example iteration comparer 208 of FIG. 2 compares (A) a population audience reach determined during an iteration to a population audience reach determined during a subsequent iteration and/or (B) a pseudo universe of the recorded audience of determined during a previous iteration to a pseudo universe of the recorded audience determined during a subsequent iteration. In some examples, the iteration comparer 208 compares the reach and/or pseudo universe estimates by applying a mathematical difference. In such examples, the difference corresponds to an error of the estimate. The lower the difference, the lower the error and vice versa. The example iteration comparer 208 determines whether or not to continue performing iterations to further converge the population reach estimate, thereby increasing the accuracy of the estimated reach. For example, the iteration comparer 208 may continue to converge the population reach estimate until the error satisfies an error threshold. The error threshold may be based on user and/or manufacture preferences.

While an example manner of implementing the example population reach determiner 130 of FIG. 1 is illustrated in FIG. 2, one or more elements, processes and/or devices illustrated in FIG. 2 may be combined, divided, re-arranged, omitted, eliminated and/or implemented in any other way. Further, the example interface 200, the example overlap analyzer 202, the example pseudo universe determiner 204, the example reach determiner 206, the example iteration comparer 208, and/or, more generally, the example the example population reach determiner 130, of FIG. 2 may be implemented by hardware, machine readable instructions, software, firmware and/or any combination of hardware, machine readable instructions, software and/or firmware. Thus, for example, any of the example interface 200, the example overlap analyzer 202, the example pseudo universe determiner 204, the example reach determiner 206, the example iteration comparer 208, and/or, more generally, the example the example population reach determiner 130, of FIG. 2 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example overlap analyzer 202, the example pseudo universe determiner 204, the example reach determiner 206, the example iteration comparer 208, and/or, more generally, the example the example population reach determiner 130, of FIG. 2 is/are hereby expressly defined to include a tangible computer readable storage device or storage disk such as a memory, a digital versatile disk (DVD), a compact disk (CD), a Blu-ray disk, etc., storing the software and/or firmware. Further still, the example population reach determiner 130 of FIG. 2 may include one or more elements, processes and/or devices in addition to, or instead of, those illustrated in FIG. 2, and/or may include more than one of any or all of the illustrated elements, processes and devices.

Figure 3:
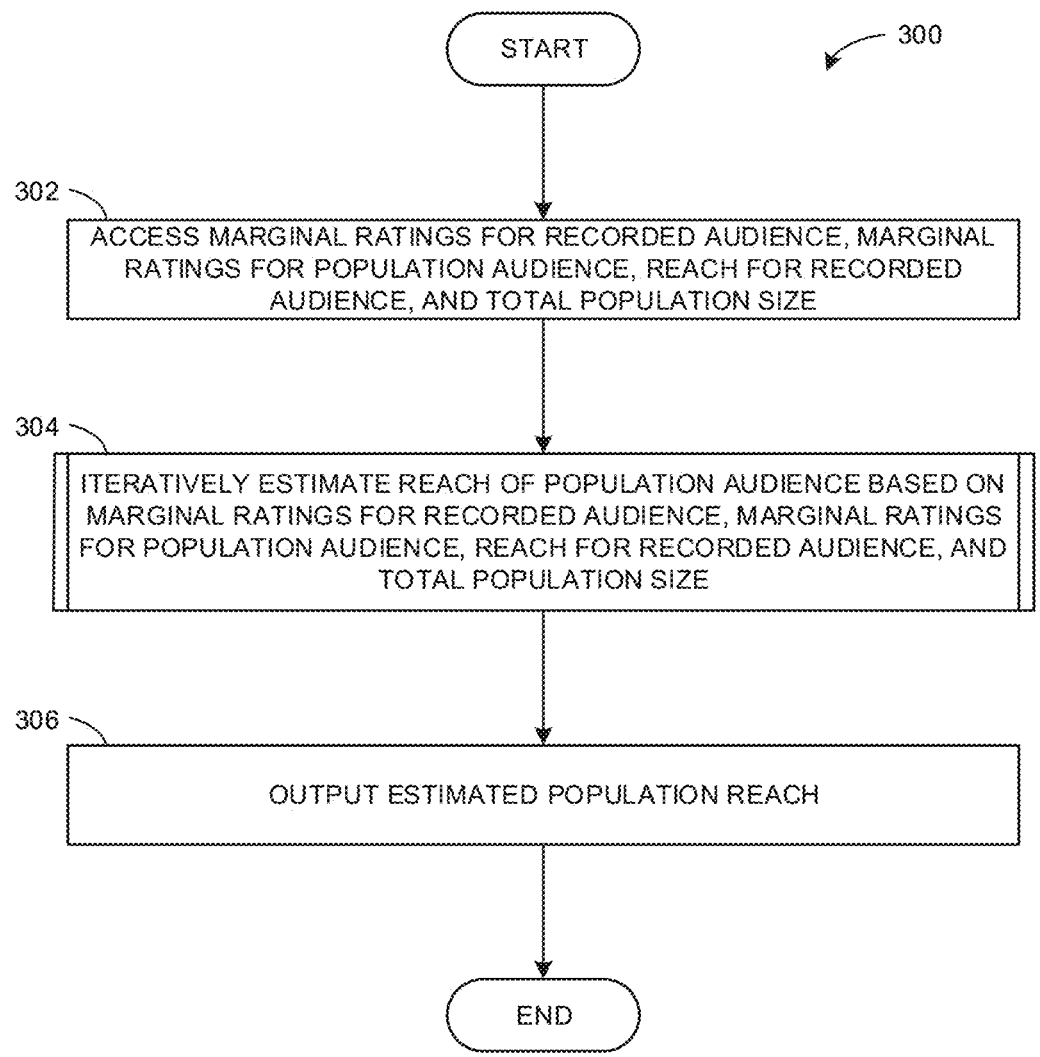
FIG. 3 is a flowchart illustrating example machine readable instructions that may be executed to implement the example population reach determiner of FIGS. 1 and/or 2.
Figure 4:
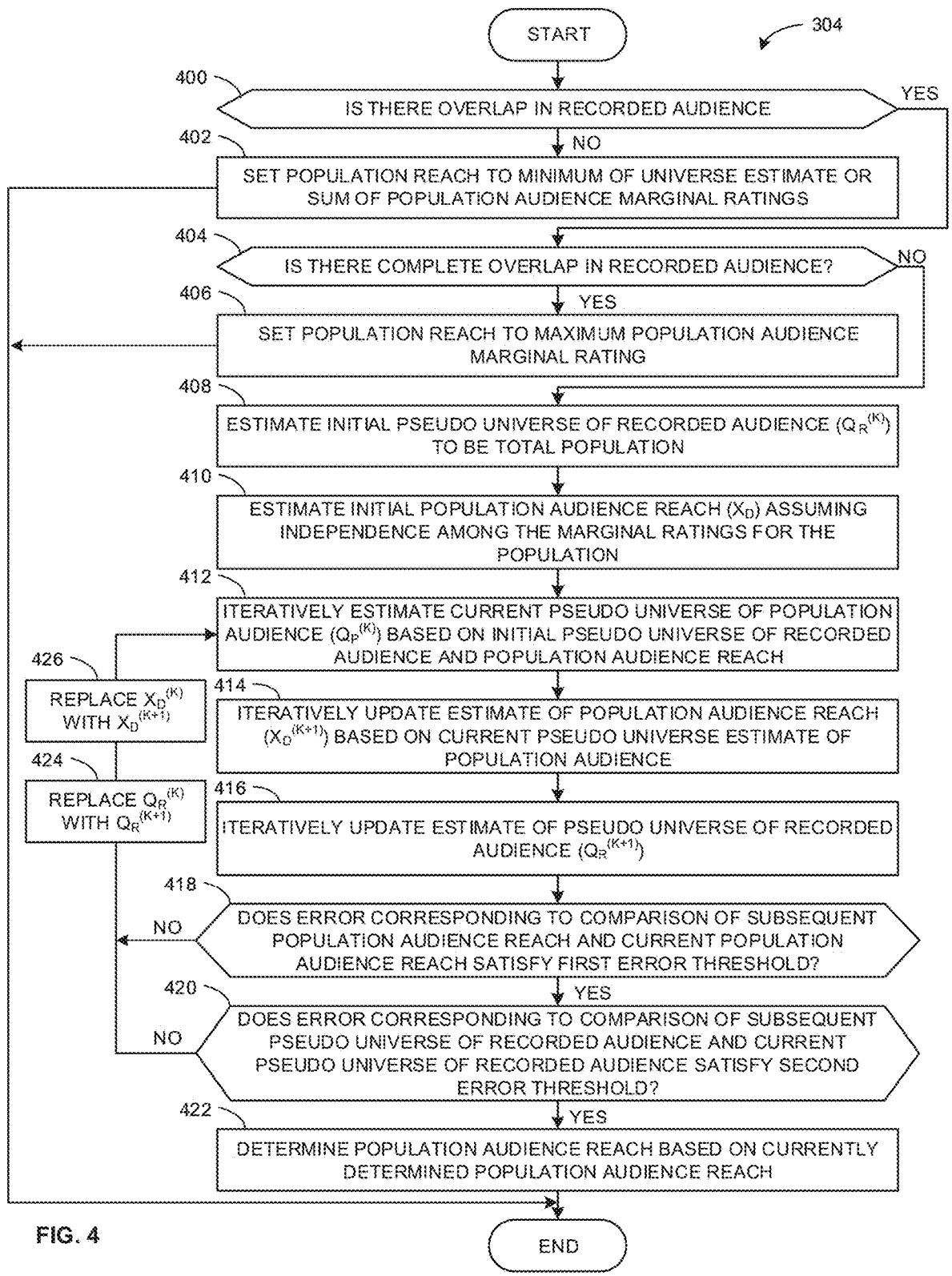
FIG. 4 is a flowchart illustrating example machine readable instructions that may be executed to implement the example population reach determiner of FIGS. 1 and/or 2.

Flowcharts representative of example machine readable instructions for implementing the example population reach determiner 130 of FIG. 2 are shown in FIGS. 3 and 4. In the examples, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3 and 4, many other methods of implementing the example population reach determiner 130 of FIG. 2 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example population reach determiner 130 of FIGS. 1 and 2 to generate a total audience reach from different marginals (e.g., quarter hours). Although the instructions of FIG. 3 are described in conjunction with population reach estimation based on quarter hour marginals of media exposure performed by the example population reach determiner 130 of FIGS. 1 and 2, the example instructions may be utilized to determine reach based on any type of media and/or marginal from any type of rating data. Additionally, the example flowchart 300 is described in conjunction with Equations 6-8. Additionally or alternatively, in some examples, the population reach determiner 130 may determine total population reach based on Equations 1a-3a and/or 1b-3b using a root-finding algorithm. In some such examples, the population reach determiner 130 may set bounds to solve Equations 1a-3a and/or 1b-3b using a root-finding algorithm. Although the below calculations are based on total audience numbers, the below calculations may be based on percentages (e.g., where each total is a percentage of the universe estimate).

At block 302, the example interface 200 accesses marginal ratings for the recorded audience (e.g., based on the meter data 102), marginal ratings for the population audience (e.g., based on the return path data 100), reach for the recorded audience from increments of time (e.g., based on the meter data 102), and a total population size (e.g. universe estimate). For example, the below example table (Table 1) includes marginal ratings of a recorded audience and corresponding reach of the recoded audience for a 1-hour program broken up into 4 quarter hour margins, where the recorded audience reach across from the 4 increments of time is 100 persons and the universe estimate (e.g., total actual population) is 1,000 persons.

TABLE 1

Example Data

| UE = 1,000 | Recorded audience | Population Audience |
|---|---|---|
| A | 60 | 75 |
| B | 80 | 70 |
| C | 40 | 60 |
| D | 50 | 50 |
| Total | 100 | Xd? |

In Table 1, UE is the universe estimate, A is the marginal for the first quarter hour, B is the marginal for the second quarter hour, C is the marginal for the third quarter house, D is the marginal for the fourth quarter hour, Total is the deduplicated total recorded audience corresponding to any of the marginals A, B, C, and D (e.g., the recorded reach), and Xd is the population reach. Alternatively, as explained above, A, B, C, and D may represent hours, days, stores, websites, etc.

At block 304, the example population reach determiner 130 estimates reach of the population audience based on the marginal ratings for the recorded audience, the corresponding margin ratings for the population audience, the reach for the recorded audience and the total population size (UE). The iterative estimation performed at block 304 is further described below in conjunction with FIG. 4. At block 306, the example interface 200 outputs the estimated population reach 306. The example interface 200 may output the estimated population reach as a signal for further processing and/or as a report to a user (e.g., customer).

FIG. 4 is an example flowchart 304 representative of example machine readable instructions that may be executed by the example population reach determiner 130 of FIGS. 1 and 2 to iteratively estimate reach of the population audience, as described above in conjunction with block 304 of FIG. 3. Although the instructions of FIG. 4 are described in conjunction with a reach estimation based on quarter hour margins of media exposure from the example population reach determiner 130 of FIGS. 1 and 2, the example instructions may be utilized to determine reach based on any type of media and/or marginals from any type of ratings data. The example flowchart 304 of FIG. 4 is described in conjunction with the above Table 1.

At block 400, the example overlap analyzer 202 determines if there is overlap in the recorded audience. For example, the overlap analyzer 202 may determine that there is overlap when the recorded reach is the not the same as (e.g., not equal to) the sum of the recorded audience marginal ratings. Using the example of Table 1, the example overlap analyzer 202 determines that there is overlap, because the recorded reach is not the same as the sum of the recorded audience marginal ratings (e.g., 100≠60+80+40+50).

If the example overlap analyzer 202 determines that there is no overlap in the recorded audience (e.g., the margins are mutually exclusive) (block 400: NO), the example reach determiner 206 sets the population reach (Xd) to the minimum of (A) the universe estimate and (B) the sum of the population audience marginal ratings (block 402). If the example overlap analyzer 202 determines that there is overlap in the recorded audience (block 402: YES), the example overlap analyzer 202 determines if there is complete overlap in the recorded audience (block 404). The example overlap analyzer 202 determines if the overlap is a complete overlap when the recorded reach is the same as (e.g., is equal to) the maximum audience marginal ratings of the margins. Using the above example of Table 1, the example overlap analyzer 202 determines that the overlap is not a complete overlap because the recorded reach is not the same as the maximum audience marginal ratings of the margins (e.g., 100≠$\text{Max}_{recorded}$(A, B, C, D)→100≠80).

If the example overlap analyzer 202 determines that there is a complete overlap in the recorded audience (block 404: YES), the example reach determiner 206 sets the population reach (Xd) to the maximum population audience marginal rating of the margins (block 406). If the example overlap analyzer 202 determines that there is not a complete overlap in the recorded audience (block 404: NO), the example pseudo universe determiner 204 sets the initial pseudo universe estimate of the recorded audience ($Q_R^k$) to be the total population size (UE) (block 408). Using the example of Table 1, the example pseudo universe determiner 204 determines the initial pseudo universe estimate of recorded audience to be 1,000 (e.g., $Q_R^0$=1,000).

At block 410, the example reach determine 206 estimates an initial population audience reach ($X_d^0$) assuming independence among the marginal ratings for the population, as shown in Equation 9.

$$X_d^0 = UE \times \left(1 - \prod_{i=1}^{N}\left(1 - \frac{X_i}{UE}\right)\right) \quad \text{(Equation 9)}$$

In Equation 9, UE is the universe estimate, N is the total number of marginals, and $X_i$ is the population marginal rating for the ith margin. Using the example of the above Table 1, the example reach determiner 206 initializes $X_d^k$ to be $$231.797 \left(\text{e.g., } 1000 \times \left(1 - \left(1 - \frac{75}{1000}\right)\left(1 - \frac{70}{1000}\right)\left(1 - \frac{60}{1000}\right)\left(1 - \frac{50}{1000}\right)\right)\right).$$

At block 412, the example pseudo universe determiner 204 iteratively estimates the pseudo universe of population audience ($Q_P^k$) based on the initial pseudo universe of the recorded audience and the population audience reach (e.g., the link tool/equation) according to Equation 6. As explained above, Equation 6 is the link tool that ties together the dependency of the audience and the assumed independency of the pseudo universes. Accordingly, using the example of Table 1, the pseudo universe determiner 204 estimates the current pseudo universe population audience for the first processing iteration to be 1,000 (e.g., 231.797+ (1000−231.797)((1000−100)/(1000−100))).

At block 414, the example reach determiner 206 iteratively updates the estimate of the population audience reach ($X_d^{k+1}$) based on the current pseudo universe of the population audience and the marginal ratings for the population audience, as shown in Equation 7. Using the example of Table 1, the example reach determiner 206 determines the current population audience reach estimate for the first processing to be $$231.797 \left(\text{e.g., } 1000 \times \left(1 - \left(1 - \frac{75}{1000}\right)\left(1 - \frac{70}{1000}\right)\left(1 - \frac{60}{1000}\right)\left(1 - \frac{50}{1000}\right)\right)\right).$$

Although the first subsequent population audience reach is the same as the current population audience reach for the first iteration, subsequent iterations will result in different population reaches.

At block 416, the example pseudo universe determiner 204 iteratively updates the estimate of the pseudo universe of recorded audience ($Q_R^{k+1}$), as shown in Equation 8. Using the example of Table 1, the example pseudo universe determiner 204 determines the subsequent pseudo universe of recorded audience to be $$473.255 \left(\text{e.g.,} \frac{100}{1-\left(1-\frac{75}{1000}\right)\left(1-\frac{70}{1000}\right)\left(1-\frac{60}{1000}\right)\left(1-\frac{50}{1000}\right)}\right).$$

At block 418, the example iteration comparer 208 determines if an error corresponding to a comparison of the subsequent population audience reach and the current population audience reach satisfies a first error threshold. For example, the iteration comparer 208 may calculate an error by computing the absolute value of the mathematical difference between the subsequent population audience reach and the current population audience. Using the example of Table 1, the iteration comparer 208 calculates the error to be 0 (e.g., |231.797−231.797|). The first threshold error corresponds to the granularity of the population audience reach and may be set or adjusted based on user and/or manufacture preferences.

If the example iteration comparer 208 determines that the error corresponding to the comparison of the subsequent population audience reach and the current population audience reach does not satisfy the first error threshold (block 418 NO), the process continues to block 424 to perform a subsequent iteration until the error is reduced to satisfy the first error threshold. At block 426, the example pseudo universe determiner 204 replaces the value of the current pseudo universe of the recorded audience (e.g., $Q_R^k$) with (e.g., sets the $Q_R^k$ equal to) the value of the subsequent pseudo universe of the recorded audience (e.g., $Q_R^{k+1}$). Using the example of Table 1, the example pseudo universe determiner 204 replaces the value of 1,000 with the value of 473.255 (e.g., sets $Q_R^k$ equal to 473.255). At block 830, the example reach determiner 206 replaces the value of the current population reach with the value (e.g., $Q_R^k$) of the subsequent population reach (e.g., $Q_R^{k+1}$). Using the example of Table 1, the example pseudo universe determiner 204 replaces the value of 231.797 with the value of 231.797 (e.g., sets $Q_R^k$ equal to 231.797). In this manner, the pseudo universe of the recorded audience and the population reach are updated for an additional iteration to decrease the error(s) corresponding to the previous iteration, thereby increasing the accuracy of the population reach estimate.

If the example iteration comparer 208 determines that the error corresponding to the comparison of the subsequent population audience reach and the current population audience reach does satisfy the first error threshold (block 418: YES), the example iteration comparer 208 determines if an error corresponding to a comparison of the subsequent pseudo universe of recorded audience and current pseudo universe of recorded audience satisfies a second error threshold (block 420). For example, the iteration comparer 208 may calculate an error by computing the mathematical difference between the subsequent pseudo universe of the recorded audience and the current pseudo universe of the recorded audience. Using the example of Table 1, the iteration comparer 208 calculates the error to be 526.745 (e.g., |473.255−1000|). The first threshold error corresponds to the granularity of the population audience reach and may be set or adjusted based on user and/or manufacture preferences. In some examples, the second error threshold is the same as the first error threshold.

If the example iteration comparer 208 determines that the second error corresponding to the comparison of the subsequent pseudo universe of the recorded audience and the current pseudo universe of the recorded audience does not satisfy the second error threshold (block 420: NO), the process continues to block 424 to perform a subsequent iteration until the error is reduced to satisfy the second error threshold. If the example iteration comparer 208 determines that the second error corresponding to the comparison of the subsequent pseudo universe of the recorded audience and the current pseudo universe of the recorded audience satisfies the second error threshold (block 420: YES), the example reach determiner 206 determines the population audience reach based on the currently determined population audience reach (block 422). Additionally or alternatively, the example reach determiner 206 may determine the population audience reach based on the subsequent determined population reach.

Using a relatively small error threshold, the above process may continue to iteratively calculate the total audience reach until the total audience reach converges to a value. For example, using the example of Table 1, the population reach converges to 106.237 at which point the pseudo universe of the population audience is 109.244 and the pseudo universe of the recorded audience is 103.028. Plugging in these values into Equations 1a-3a verifies these results. For example, applying the pseudo universe for the recorded audience into Equation 1 results in 0.02392=0.02392, applying the pseudo universe for the recorded and population audiences and the total population reach into Equation 2 results in 0.003365=0.003365, and applying the pseudo universe for the population audiences and the total population reach into Equation 3 results in 0.027528=0.027528).

Equations 1b-3b can be derived as follows. For some finite or infinite discrete subset S of real numbers, n functions and n numbers may be specified (f1, . . . , fn and a1, . . . an). In such an example, consider class C of all discrete random variables X which are supported on S and satisfy the n conditions (e.g., $E[f_j(X)]=a_j$ for j=1, . . . , n). If there exists a member of C which assigns a positive probability to all members of S and there exists a maximum entropy distribution for C, then the distribution has the following shape: $\Pr(X=x_k)=\exp(-\Sigma_{j=1}^n \lambda_j f_j(x_k))$ for j=1, . . . , n. Where the constants $\lambda_j$ have to be determined so that the above conditions for the expected values are satisfied. Conversely, if constraints $\lambda_j$ like this can be found, then the above distribution is the maximum entropy distribution for our class C.

As equivalent expression is to define $z_j=e\hat{\,}(-\lambda_j)$ and the distribution is now in the multiplicative form: $\Pr(X=x_k)= \Pi_{j=1}^n z_j^{f_j(x_k)}$. Similar statements can be made for principle minimum discrimination information (e.g., Principle of Minimum Cross Entropy). The minimum cross-entropy distribution for C with prior distribution Q is given by: Equation 4. Which shorthand notation $P_k=\Pr(X=x_k)$ and the constants $\lambda_j$ have to be determined so that the above conditions for the expected values are satisfied.

If there are known constraints, then the Lagrange multipliers can be solved to satisfy the constraints. For example, P and Q are defined on some domain S, where A has n function constrains and P has the same m<n functions with possibly difference expected values (e.g., $E_Q[f_j(X)]=a_j$ for j=1, . . . , n and $E_P[f_j(X)]=b_j$ for j=1, . . . , n). If Q is both the maximum entropy distribution to those constraints, with n Lagrange multipliers $\lambda_1, \ldots, \lambda_n$, and also the prior distribution used for the minimum cross-entropy distribution solution, P, then the optimal answer for $E_P[f_j(X)]=c_j$ for j=m+1, . . . , n, is identical to as if P is a maximum entropy probability distribution, with n-m functional relationships $g_j(f, z)=g_j(f, (b,c))$, which can be used to solve $c_j$ directly for $j=\{m+1, \ldots, n\}$. In some examples, the above theorem may be used in other cases/problems that may require two or more linking equations (e.g., for two or more unknowns). In such examples, the theorem may be used to solve the two or more linking equations regardless of the structure of the particular case/problem.

In some examples (e.g., a special case of the above theorem), an n dimensional cube is considered representing all combination of participating in n events, such as visiting websites, watch television, etc., on n different days. If from a panel the audience for each event as well as total audience across all n events are known, then there are n+2 total constraints, n for each event, another for the total audience, and one or summing to 100%.

On the population side, the audience for each event may only been known and there may be a need to estimate total audience. Functions $f_j(X)$ are the same for both, either representing which probabilities to add to represents which events, it is just that what they may equal may differ. Additionally the population constraints are a subset of the prior constraint functions, with only the total audience not included. Thus, n+2 constraints are known for the prior, but only n+1 constraints for the population.

If $z_A$ represents the exponential of the Lagrange multiplier for that constraint and a function $z_A$ in terms of the constraint function, f, and measured observables can be determined, then it is known that it should equal the same function on the population side for their observables. That is, if $\{a\}$ is a set of constraint values for the prior, including the total audience constraint, and $\{b,c\}$ are those values for the population with c representing the unknown audience then $h(\{f\},\{a\})=h(\{f\},\{b,c\})$ of which c can be solved directly.

Since there are n+2 multipliers, where n represents the multipliers for the individual event audiences, and the remaining two are for the total audience and sum is 100% constraint, they can be enumerated as $z_i$ for $i=\{1, \ldots, n\}$, $z_A$, and $z_d$ respectively.

The n+2 functions for those constraints are all linear and binary in form whether that probabilities does or does not contribute to that constraint. As such all exponents are either $\{0,1\}$ whether contributing or not. The probability distribution can be represented compactly as: $p(e_1 e_2 e_3 \ldots )=z_d z_A \Pi_{e_j=a} z_j$, where the product is only with the j indices in which $e_j=1$. The only special case is $p(000\ldots)=z_d$ as that probability does not contribute to any constraint other than 100%. Table 2 illustrates four out of eight of the probabilities for n=3.

TABLE 2

| Probability | Multipliers | Meaning |
|---|---|---|
| $P_{000}$ | $z_d$ | Not part of any event |
| $P_{100}$ | $z_d z_A z_1$ | Event 1 only |
| $P_{110}$ | $z_d z_A z_1 z_2$ | Event 2 only |
| $P_{111}$ | $z_d z_A z_1 z_2 z_3$ | Member of all three events |

For n=3, there are five constraints to be solved $(z_i, z_A, z_d)$ which represent the five constraints of Equations 10a-10e.

$$p_{100}+p_{110}+p_{101}+p_{111}=A1 \quad \text{(Equation 10a)}$$

$$p_{010}+p_{110}+p_{011}+p_{111}=A \quad \text{(Equation 10b)}$$

$$p_{001}+p_{101}+p_{001}+p_{111}=A3 \quad \text{(Equation 10c)}$$

$$p_{100}+p_{010}+p_{001}+p_{110}+p_{101}+p_{011}+p_{111}=Ad \quad \text{(Equation 10d)}$$

$$p_{000}+p_{100}+p_{010}+p_{001}+p_{110}+p_{101}+p_{011}+p_{111}=1 \quad \text{(Equation 10e)}$$

The first constraint (e.g., Equation 10a, corresponding to the audience of the first set), are those probabilities which have a 1 on the first index. Likewise, the second constraint corresponds to a 1 in the second index and the third constraint correspond to a 1 in the third index. The total audience $(A_d)$ is all probabilities which have a 1 anywhere. Substituting the formulas for each probability and factoring results in Equations 11a-11c.

$$z_d z_A z_1(1+z_2+z_3+z_2 z_3)=A_1 \quad \text{(Equation 11a)}$$

$$z_d z_A z_2(1+z_2+z_3+z_1 z_3)=A_1 \quad \text{(Equation 11b)}$$

$$z_d z_A z_2(1+z_2+z_3+z_1 z_2)=A_1 \quad \text{(Equation 11c)}$$

Additionally or alternatively, a fourth event may be determined in a similar manner resulting in Equation 11d.

$$z_d z_A z_4(1+z_2+z_3+z_1 z_2+z_1 z_3+z_2 z_3+z_1 z_2 z_3)=A_4 \quad \text{(Equation 11d)}$$

Equation 11d corresponds to a composition of audiences of $A_4$ including audience members who (1) only were in the $4^{th}$ event and no other (e.g., 1 combination), (2) were in the $4^{th}$ event and one other (3 combinations), (3) were in the $4^{th}$ event and two others (3 combinations), and (4) were in the $4^{th}$ event and three others (1 combination). The initial three multipliers all also contribute to 100%, Total audience, and $4^{th}$ event audience.

For any n, Equation 12 can be derived using algebra.

$$z_d z_A z_i \Pi_{j=1, j\neq i}^{n}(1+z_j)=A_i \; i=\{1,2,\ldots,n\} \quad \text{(Equation 12)}$$

The product of Equation 12 is taken over all terms excluding the terms for the current constraint. Accordingly, being included in the ith event means possibly being included in the other n−1 events.

For the total audience constraint, the above logic is followed, resulting in a product through all n combinations, except the final product is subtracted by one, because an audience member cannot be in the total audience without being in any individual event. The total audience constraint is reflected in Equation 13.

$$z_d z_A(\Pi_{j=1}^{n},(1+z_j)-1)=A_d \quad \text{(Equation 13)}$$

The final constraint is similar to $A_d$, except for the inclusion of $p_{00\ldots}$, which equals $z_d$. Accordingly, all n+2 constraints in the form of $(z_i, z_A, z_d)$ are reflected in Equations 14a-14c $$z_d z_A z_i \Pi_{j=1, j\neq i}^{n}(1+z_j)=A_i \; i=\{1,2,\ldots,n\} \quad \text{(Equation 14a)}$$

$$z_d z_A(\Pi_{j=1}^{n},(1+z_j)-1)=A_d \quad \text{(Equation 14b)}$$

$$z_d+z_d z_A z_i(\Pi_{j=1}^{n},(1+z_j)-1)=1 \quad \text{(Equation 14c)}$$

According to Equations 14a-14c, $(z_i, z_A, z_d)$ are in terms of $(A_i, A_d, 1)$. According to Equations 14b and 14c, $z_d=1-A_d$. Additionally or alternatively, because $P_{000\ldots}$ is the probability of not being a member of any audience and does not contribute to the constraint of 100%, P000...$=z_d$. Thus, $P_{000\ldots}=1-A_d=z_d$.

To simplify Equations 14a-14c, the constraint P is defined as $\Pi_{j=1}^{n}, (1+z_j)$, thereby resulting in Equations 15a-15c $$z_d z_A z_i \frac{P}{1+z_i} \; i=\{1,2,\ldots,n\} \quad \text{(Equation 15a)}$$

$$z_d z_A(P-1)=A_d \quad \text{(Equation 15b)}$$

$$z_d + z_d z_A z_i(P-1) = 1 \quad \text{(Equation 15c)}$$

Solving Equation 15a for P results in $$P = \frac{A_i(1+z_i)}{z_d z_A z_i},$$

which is a constant independent of index i. Because $z_d$ and $z_A$ are also dependent of i, $$\frac{A_i(1+z_i)}{z_i} = Q,$$

for some constraint Q, which may be rearranged to determine a formula for $z_i$ for each i, which depend on $A_i$ and Q. Using substitution, $$P = \frac{Q}{z_d z_A}.$$

Thus, Equation 15b can be simplified to $z_d z_A = Q - A_d$. Because $z_d = 1 - A_d$, $z_d$ is defined by Equation 16 (e.g., corresponding to the linking Equation 2b, with Q being a by-product).

$$z_A = \frac{Q - A_d}{1 - A_d} \quad \text{(Equation 16)}$$

To determine Q, substitution may be used to define P as $$\frac{Q}{Q - A_d},$$

which is equal to $\Pi_{j=1}^{n}$, $(1+z_j)$ (e.g., the definition of constraint P). Accordingly, the above equation may be simplified resulting in Equation 17/1b.

$$1 - \frac{A_d}{Q_R} = \prod_{i=1}^{N}\left(1 - \frac{A_i}{Q_R}\right) \quad \text{(Equation 17/1b)}$$

Where Q represents a physical property and behaves as a pseudo-universe-estimate. It is the value the Universe Estimate would need to be such that what you did observe for the total audience is identical to what it would be if you assumed independence. Once Q is solved from Equation 17, the values of $(z_i, z_A, z_d)$ may be determined. Q may also be determined for the total audience of the population ($Q_P$) in a similar manner, resulting in Equation 18/1a:

$$1 - \frac{A_d}{Q_R} = \prod_{i=1}^{N}\left(1 - \frac{A_i}{Q_R}\right) \quad \text{(Equation 18/1a)}$$

Figure 5:
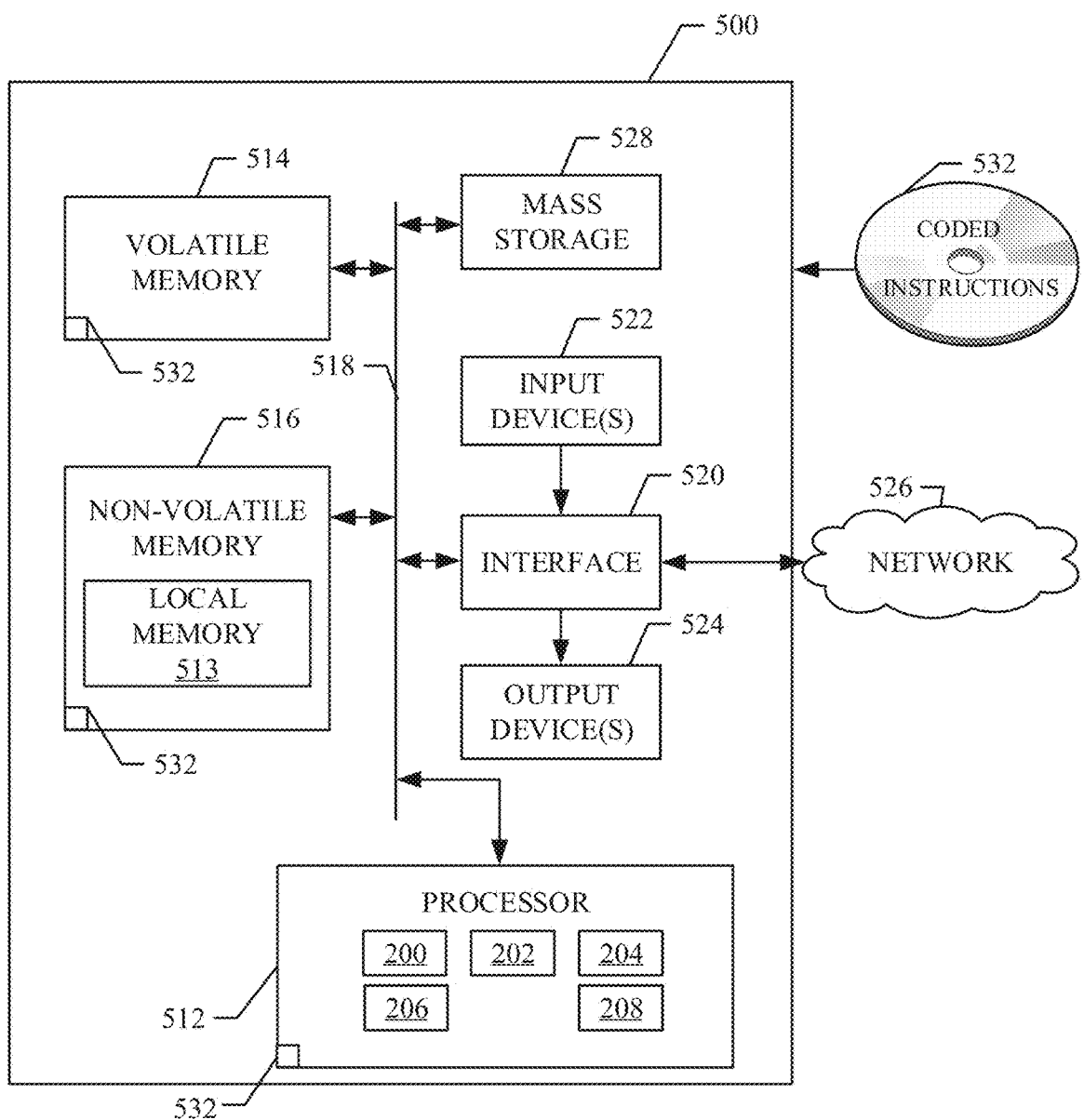
FIG. 5 is a block diagram of an example processing system structured to execute the example machine readable instructions of FIGS. 3 and 4 to implement the example population reach determiner of FIGS. 1 and/or 2.

FIG. 5 is a block diagram of an example processor platform 500 capable of executing the instructions of FIGS. 3 and 4 to implement the example population reach determiner 130 of FIG. 1. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes the instructions of FIG. 3 to the example interface 200, the example overlap analyzer 202, the example pseudo universe determiner 204, the example reach determiner 206, and/or the example iteration comparer 208 to implement the example population reach determiner 130 of FIG. 2. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver circuit or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3 and 4 may be stored in the mass storage device 528, in the volatile memory 514, in the non-volatile memory 516, and/or on a removable tangible computer readable storage medium such as a CD or DVD.

From the foregoing, it should be appreciated that the above disclosed methods, apparatus, and articles of manufacture estimate population reach from marginal ratings. Example disclosed herein determine the reach analytically using the above Equations 1-3 and/or Equations 6-8. Traditional techniques for determining reach from different margins include determining the reach numerically. However, such traditional techniques are unsolvable for a large number of margins dues to memory and/or processing constraints. Examples disclosed herein alleviate the problems associated with such traditional techniques by demining the reach analytically (e.g., via solving the disclosed Equations). Using examples disclosed herein reach can be determined from a nearly infinity number of margins.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to determine a reach of media for a total population audience from marginal ratings, the apparatus comprising:
   memory including computer readable instructions; and
   a processor to execute the instructions to at least:
      access (i) first marginal ratings for a plurality of margins, the first marginal ratings representative of corresponding different portions of a recorded audience of panelists exposed to media at corresponding different periods of time, (ii) second marginal ratings provided by a media provider for the total population audience of the media, and (iii) a first reach of the media for the recorded audience of the panelists exposed to the media across the plurality of margins, the media divided into the different periods of time;
      iteratively converge on an output estimate of a reach of the media for the total population audience, wherein for a first process iteration, the processor is to (i) determine a first total population audience reach estimate for the first process iteration, the first total population audience reach estimate based on (a) the first marginal ratings representative of the corresponding different portions of the recorded audience exposed to the media at the corresponding different periods of time, (b) the second marginal ratings for the population audience of the media, (c) the reach for the recorded audience of the panelists exposed to the media across the plurality of the margins, and (d) a link expression based on a first pseudo universe estimate of the total population audience determined based on a first pseudo universe estimate of the recorded audience corresponding to the first process iteration, the link expression to link at least one dependency associated with the second marginal ratings to at least one dependency associated with the first marginal ratings; and (ii) evaluate an error between the first total population audience reach estimate determined from the first process iteration and a prior second total population audience reach estimate determined from a prior second process iteration; and
      output the estimate of the reach for the total population audience.

2. The apparatus of claim 1, wherein the processor is to:
   determine a second pseudo universe estimate of the recorded audience; and
   execute a subsequent third process iteration when the error between the first total population audience reach estimate and the prior second total population audience reach estimate does not satisfy an error threshold.

3. The apparatus of claim 2, wherein the processor is to initialize the estimate of the reach for the total population audience reach prior to the first iteration.

4. The apparatus of claim 3, wherein the processor is to initialize the first pseudo universe estimate of the recorded audience prior to the first iteration.

5. The apparatus of claim 4, wherein the first pseudo universe estimate of the recorded audience is initialized with a total population size.

6. The apparatus of claim 4, wherein the processor is to execute the subsequent third process iteration when a second error corresponding to a comparison of the second pseudo universe of the recorded audience and the first pseudo universe of the recorded audience does not satisfy the error threshold.

7. The apparatus of claim 6, wherein the processor is to determine the estimate of the reach for the total population audience to be at least one of the first total population audience reach estimate or the prior second total population audience reach estimate when the error threshold is satisfied.

8. The apparatus of claim 2, wherein the reach for the total population audience is a reach across two or more time intervals corresponding to the second marginal ratings for the total population audience.

9. The apparatus of claim 8, wherein:
   the second pseudo universe estimate of the recorded audience is based on an assumed independence among the first marginal ratings for the recorded audience; and
   the first pseudo universe estimate of the total population audience is based on an assumed independence among the second marginal ratings for the total population audience.

10. The apparatus of claim 9, wherein the processor is to execute the first process iteration and the subsequent third iteration to converge on the estimate of the reach for the total population audience corresponding to a deduplicated number of persons exposed to the media across the time intervals.

11. The apparatus of claim 10, wherein the time intervals are quarter hours.

12. The apparatus of claim 2, wherein the processor is to execute a fourth process iteration when a second error corresponding to the subsequent third process iteration does not satisfy the error threshold.

13. A method to determine reach of media from marginal ratings, the method comprising:
    accessing (i) first marginal ratings for a plurality of margins for a recorded audience of panelists exposed to media, the first marginal ratings representative of corresponding different divisions of the media with respect to time, (ii) second marginal ratings provided by a media provider for a population audience of the media, and (iii) a first reach of the media for the recorded audience of the panelists exposed to the media across the plurality of margins;
    iteratively converging on an output estimate of a reach of the media for the population audience, wherein for a first process iteration, wherein the iterative converging includes: (i) determining a first population audience reach estimate for the first process iteration, the first population audience reach estimate based on (a) the first marginal ratings for the recorded audience exposed to the media, (b) the second marginal ratings for the population audience of the media, (c) the reach for the recorded audience of the panelists exposed to the media across the plurality of the margins, and (d) a link expression based on a first pseudo universe estimate of the total population audience determined based on a first pseudo universe estimate of the recorded audience corresponding to the first process iteration, the link expression to link at least one dependency associated with the second marginal ratings to at least one dependency associated with the first marginal ratings; and (ii) evaluating an error between the first population audience reach estimate determined from the first process iteration and a prior second population audience reach estimate determined from a prior second process iteration; and outputting the estimate of the reach for the population audience.

14. The method of claim 13, wherein iteratively estimating the reach for the population audience includes:

determining a second pseudo universe estimate of the recorded audience; and executing a subsequent third process iteration when the error between the first population audience reach estimate and the prior second population audience reach estimate does not satisfy an error threshold.

15. The method of claim 14, further including initializing the estimate of the reach for the population audience reach prior to the first iteration.

16. The method of claim 15, further including initializing the first pseudo universe estimate of the recorded audience prior to the first iteration.

17. The method of claim 16, wherein the first pseudo universe estimate of the recorded audience is initialized with a total population size.

18. The method of claim 16, further including executing the subsequent third process iteration when a second error corresponding to a comparison of the second pseudo universe of the recorded audience and the first pseudo universe of the recorded audience does not satisfy the error threshold.

19. The method of claim 18, further including, when the error threshold is satisfied, determining the estimate of the reach for the population audience to be at least one of the first population audience reach estimate or the prior second population audience reach estimate.

20. A non-transitory computer readable storage medium comprising instructions which, when executed, cause a machine to at least:

access (i) first marginal ratings for a plurality of margins for a recorded audience of panelists exposed to media, (ii) second marginal ratings provided by a media provider for a population audience of the media, and (iii) a first reach of the media for the recorded audience of the panelists exposed to the media across the plurality of margins, the margins including a first margin and a second margin, the first margin corresponding to a first duration of time for the media and the second margin corresponding to a second duration of time for the media;

iteratively converge on an output estimate of a reach of the media for the population audience, wherein for a first process iteration, wherein the iterative converging includes (i) determining a first population audience reach estimate for the first process iteration, the first population audience reach estimate based on (a) the first marginal ratings, (b) the second marginal ratings, (c) the reach for the recorded audience of the panelists exposed to the media across the plurality of the margins, and (d) a link expression based on a first pseudo universe estimate of the total population audience determined based on a first pseudo universe estimate of the recorded audience corresponding to the first process iteration, the link expression to link at least one dependency associated with the second marginal ratings to at least one dependency associated with the first marginal ratings; and (ii) evaluating an error between the first population audience reach estimate determined from the first process iteration and a prior second population audience reach estimate determined from a prior second process iteration; and output the estimate of the reach for the population audience.

* * * * *